INVENTOR
LAMAR T. ATWOOD

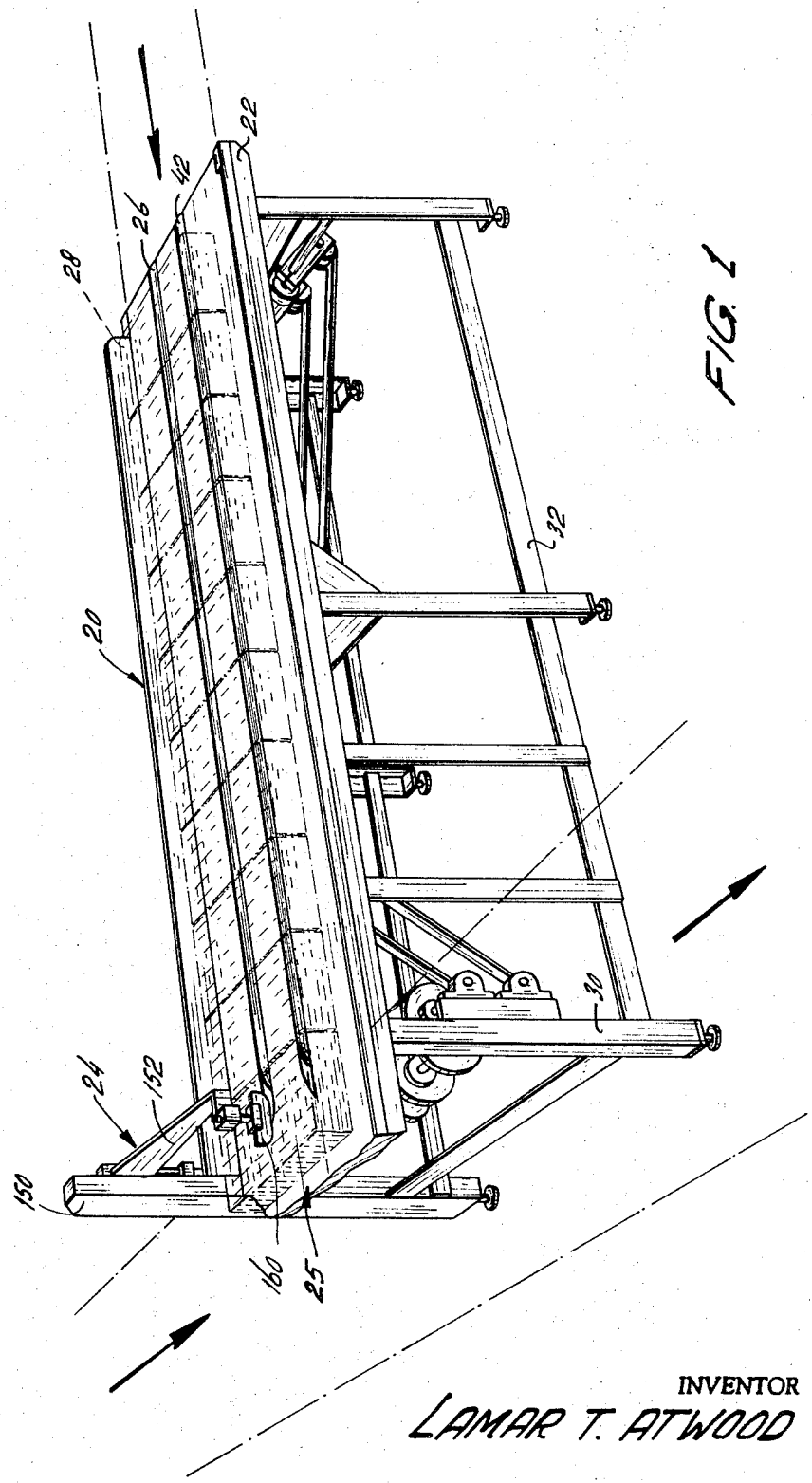

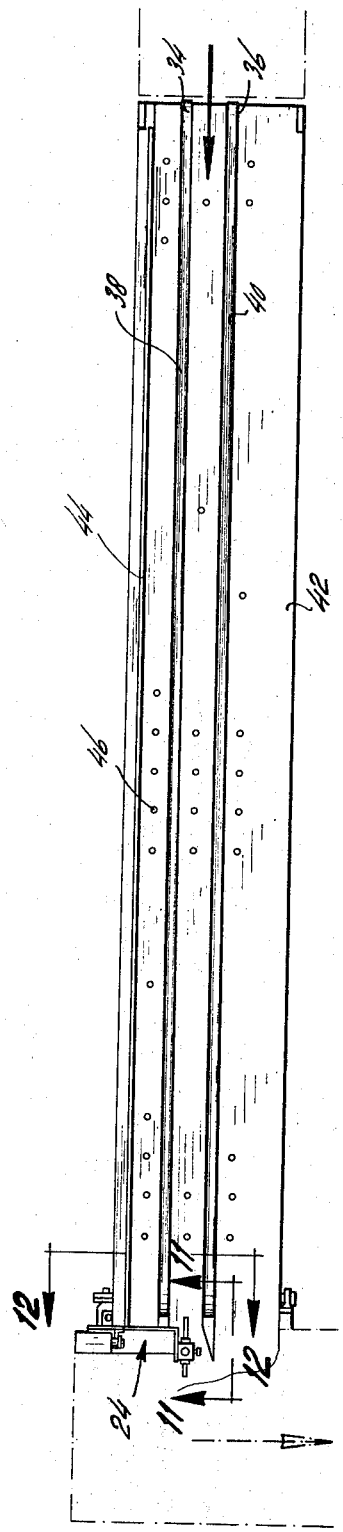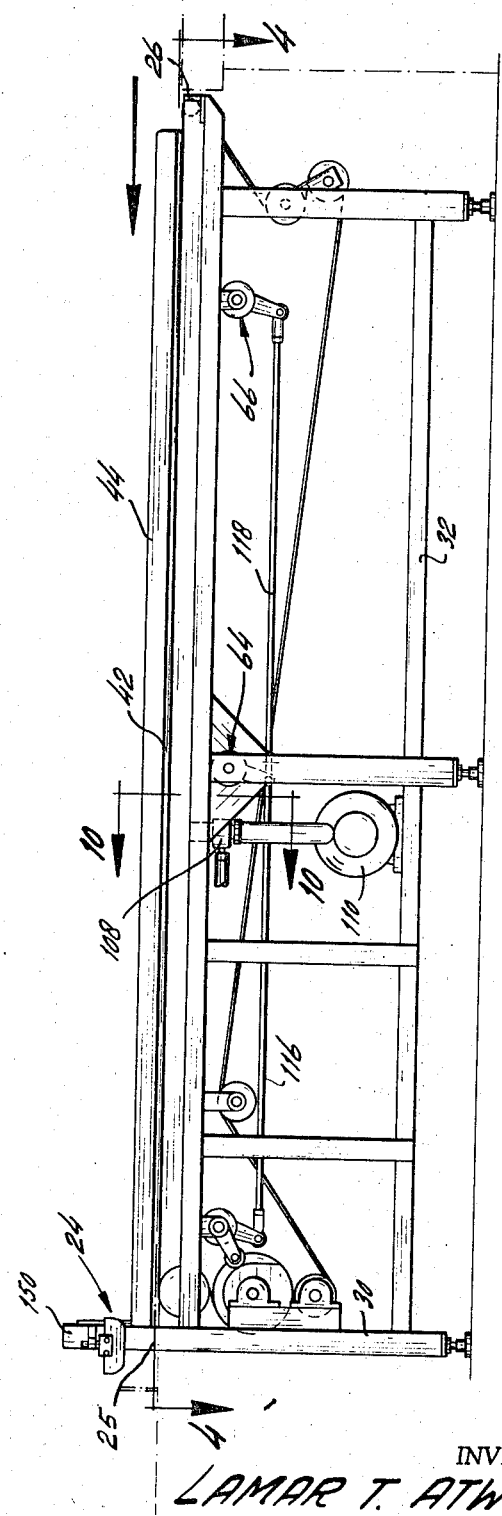

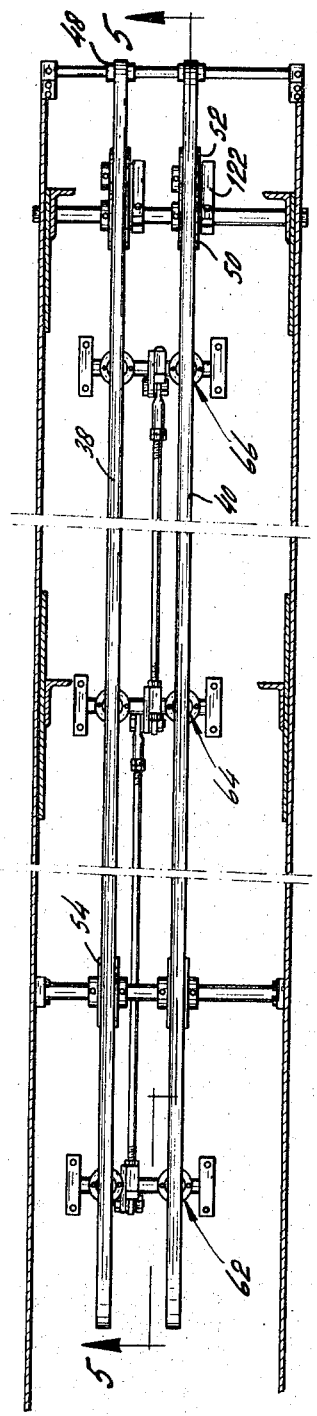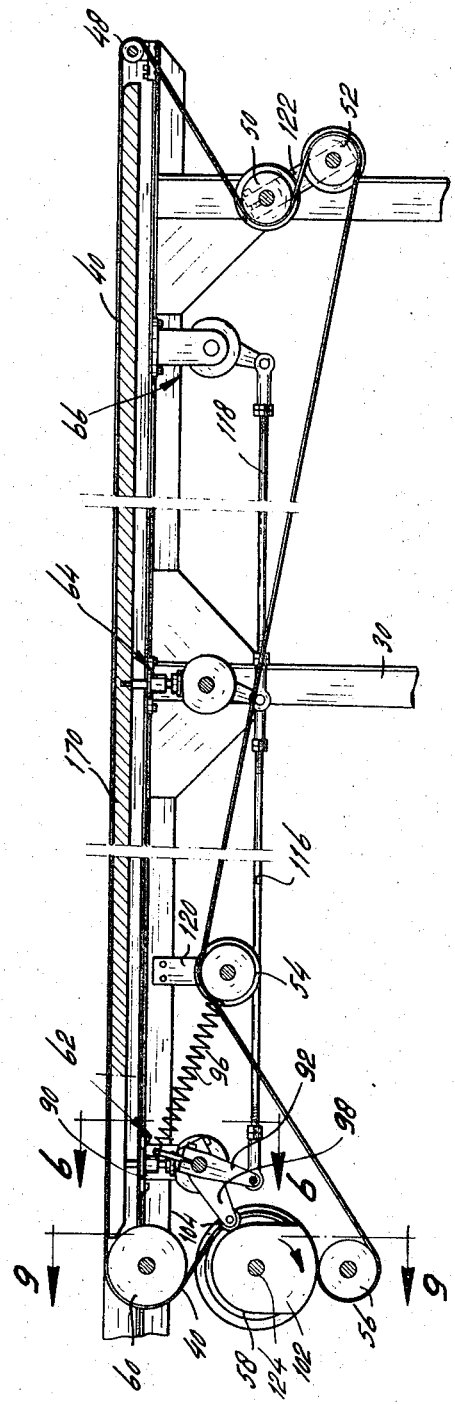

BY *Semmes and Semmes*

ATTORNEYS

INVENTOR
LAMAR T. ATWOOD

BY Semmes and Semmes
ATTORNEYS

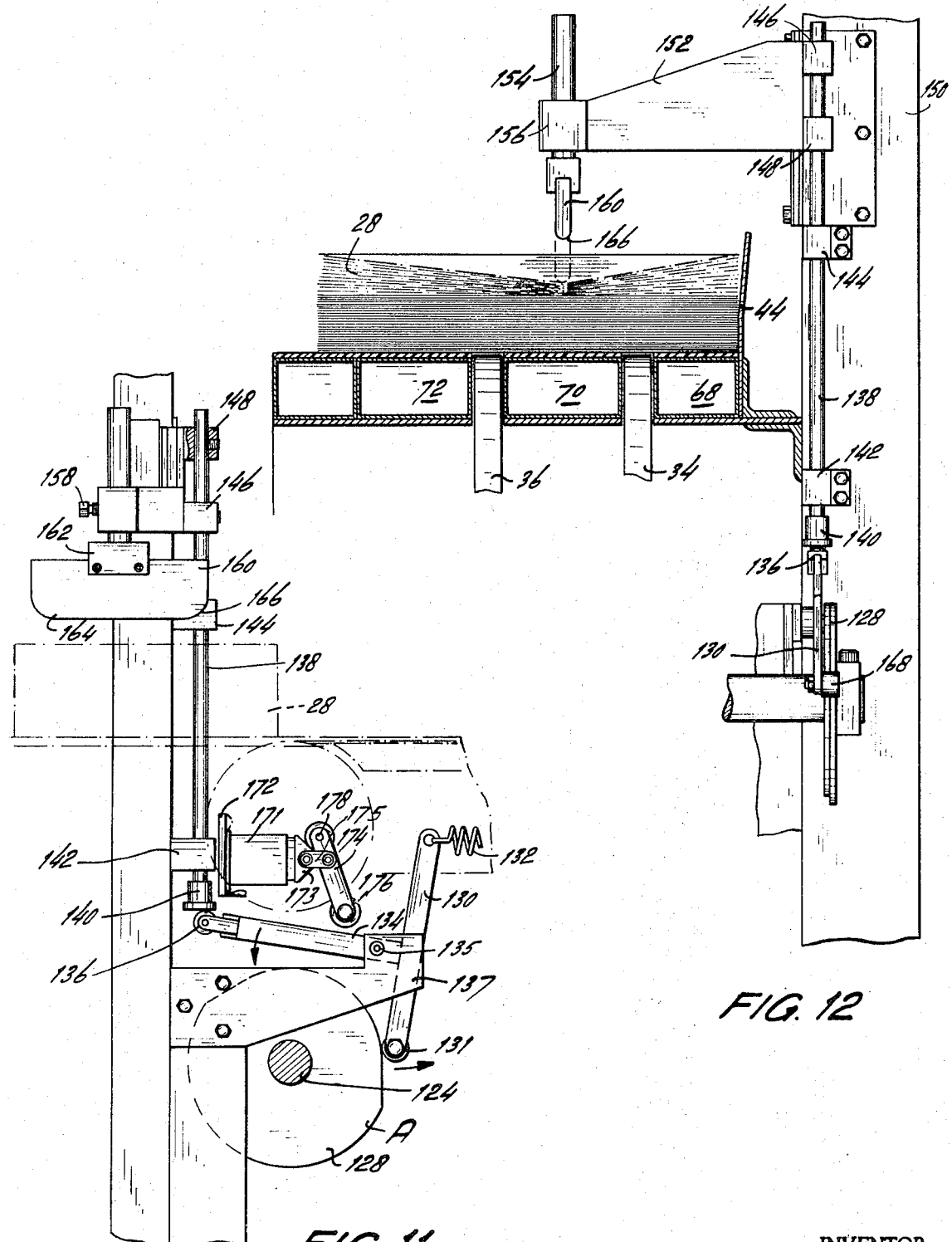

Sept. 22, 1970 L. T. ATWOOD 3,529,709
METHOD OF REGISTER FEEDING
Filed March 20, 1969 8 Sheets-Sheet 7
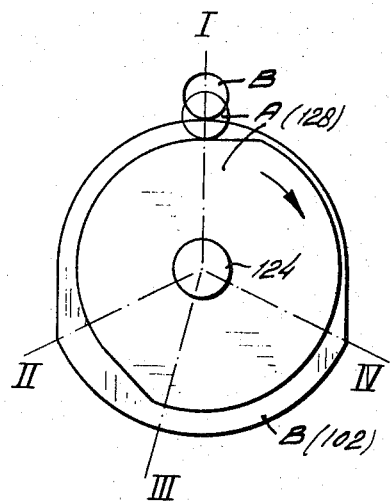
FIG. 13
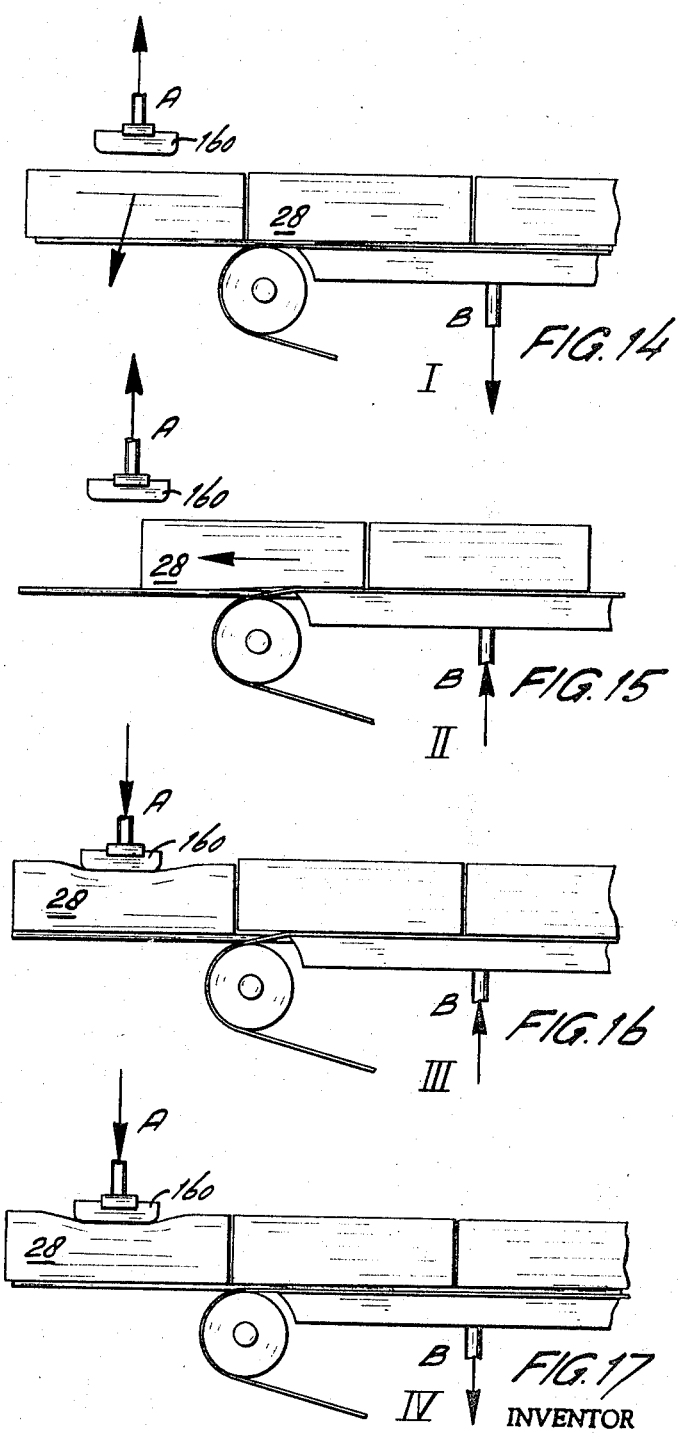
INVENTOR
LAMAR T. ATWOOD
BY Semmes and Semmes
ATTORNEYS Sept. 22, 1970 L. T. ATWOOD 3,529,709
METHOD OF REGISTER FEEDING
Filed March 20, 1969 8 Sheets-Sheet 8

INVENTOR.
LAMAR T. ATWOOD
BY David H. Semmes
ATTORNEY

United States Patent Office 3,529,709
Patented Sept. 22, 1970

3,529,709
METHOD OF REGISTER FEEDING

Lamar T. Atwood, Cumberland Center, Maine, assignor to Southworth Machine Company, Portland, Maine, a corporation of Maine
Filed Mar. 20, 1969, Ser. No. 808,764
Int. Cl. B65g 47/00
U.S. Cl. 198—26
7 Claims

ABSTRACT OF THE DISCLOSURE

Method of register feeding a plurality of objects, such as longitudinally aligned reams of paper, including longitudinally surging the reams within a collecting area having a receiving end and a feeding end, by engaging the objects from beneath and between said ends and pushing vertically downwardly on a leading ream, at the feeding end, so as to force said reams into stopped abutment, then releasing said leading ream, as it is desired to surge the lead ream through the feeding end.

BACKGROUND OF THE INVENTION

Field of the invention

Register feeding by pivoting endlessly rotating belts into and out of the table surface. Earlier inventors have devoted a lot of attention to the surge driving of material within a conveyor line by lifting of sprocket chains or belt conveyors into the conveyor plane. However, none have suggested an overhead stop assembly which engages the material being surge driven and its readily coordinated with the surging assembly.

Description of the prior art

Prior art investigations has developed the following: McKee, 1,976,855; Webster, 2,096,772; Blickenderfer, 2,731,130; Stremke, 3,155,222; Blake, 3,352,403; and Standley, 3,368,660.

These prior art patents suggest lifting of sprocket chains or belt conveyors into a conveyor plane, so as to advance packages or the like. Note for example, Blickenderfer FIGS. 3 and 4. Webster shows a tongue 41 for lifting articles from the conveyor chains (page 2, lines 39–60). Stremke shows lift means 14 which are in the form of endless belts used in connection with stops 50 and 31. The remaining patents, Blake, McKee, and Standley are cited to show conventional service surging devices, involving complex stop means.

SUMMARY OF THE INVENTION

According to the present method, a register feed table may be provided with surging characteristics by pivoting rotating belts into and out of the table surface. Coordinated with the surging drive is an overhead stopping assembly at the feeding end of the table which pushes downwardly onto the lead ream, so as to hold the lead ream before delivery into a transfer assembly. The prior art does not suggest the combination of surging belts with an overhead stop assembly.

BRIEF DESCRIPTION OF THE DRAWINGS

FIG. 1 is a perspective view of a proposed register feeding table, showing a plurality of longitudinally aligned reams in phantom, stopped at their feeding end and extending towards the receiving end;

FIG. 2 is a top plan thereof;

FIG. 3 is side elevation;

FIG. 4 is a top plan of the belt drive assembly with the top of the table removed;

FIG. 5 is a side elevation partially in section, of the belt drive assembly;

FIG. 11 is fragmentary elevation, partially in section, taken along section line 11—11 of FIG. 2;

FIG. 12 is a fragmentary section, taken along section line 12—12 of FIG. 2;

FIG. 13 is a schematic view, showing the positioning of cams A and B, regulating respectively the ream stop assembly at the feeding end and the surging assembly extending beneath the conveyor table; and FIGS. 14–17 are schematic views showing the coordination of stopping and surging by cams A and B, as follows:

FIG. 14 shows the device in state of rest without surging drive or pushing so as to stop;

FIG. 15 shows the surging upwardly of the belt drive assembly by means of cam B, so as to advance the reams longitudinally towards the stopping assembly;

FIG. 16 shows, surging while stopping the leading ream by pushing downwardly;

FIG. 17 shows the stopping of surging while pushing downwardly on the lead ream;

DESCRIPTION OF THE PREFERRED EMBODIMENTS

Figure 6:
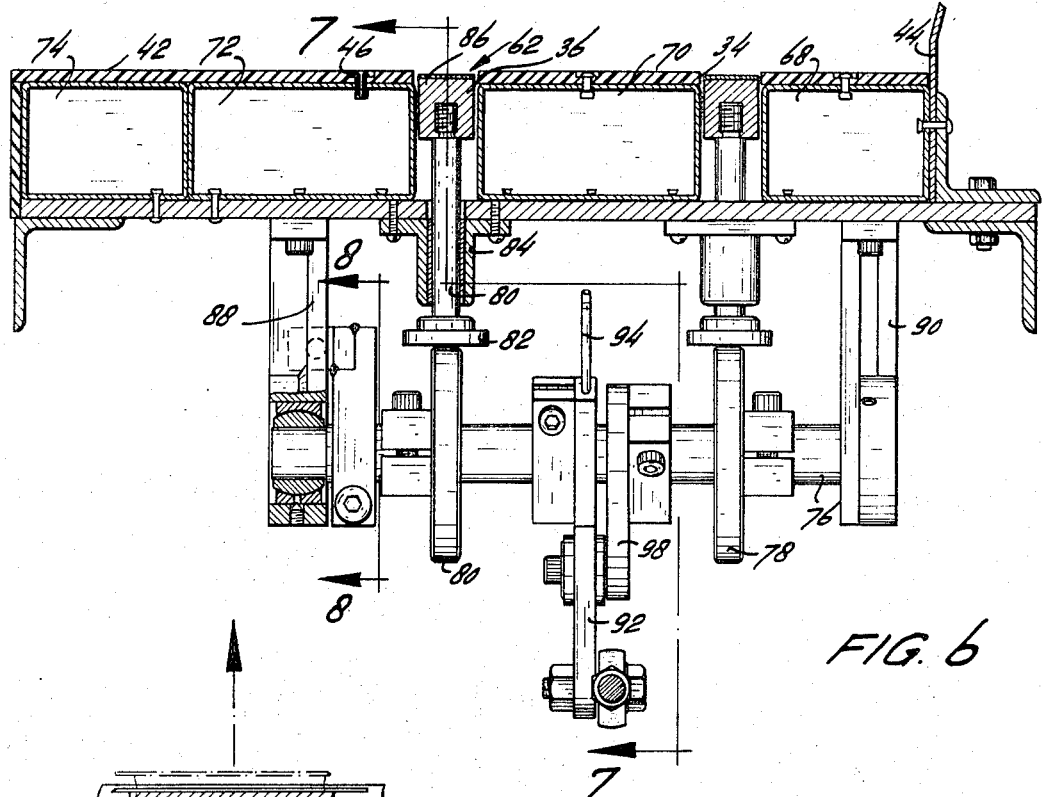
FIG. 6 is a transverse sectional view taken along section line 6—6 of FIG. 5.

In FIGS. 1 and 2, a proposed register feed table, generally designated as 20, is shown as having a top surface 42, enclosed by longitudinally extending sides 22. Table 20 may be supported upon legs 30, having horizontal intermediate struts 32. Reams of paper 28 or even solid objects may be introduced by endless belt means or the like (not illustrated) at the receiving end 26 and onto tapes 38 and 40, endlessly rotated in slots 34 and 36 in the table surface, so as to advance reams 28 towards the ream stop assembly, generally designated as 24 at the feeding end 25 of the table surface. The advance of the reams is halted by downward pressure of arm 24, so that stop plate 160 engages the lead ream.

Figure 9:
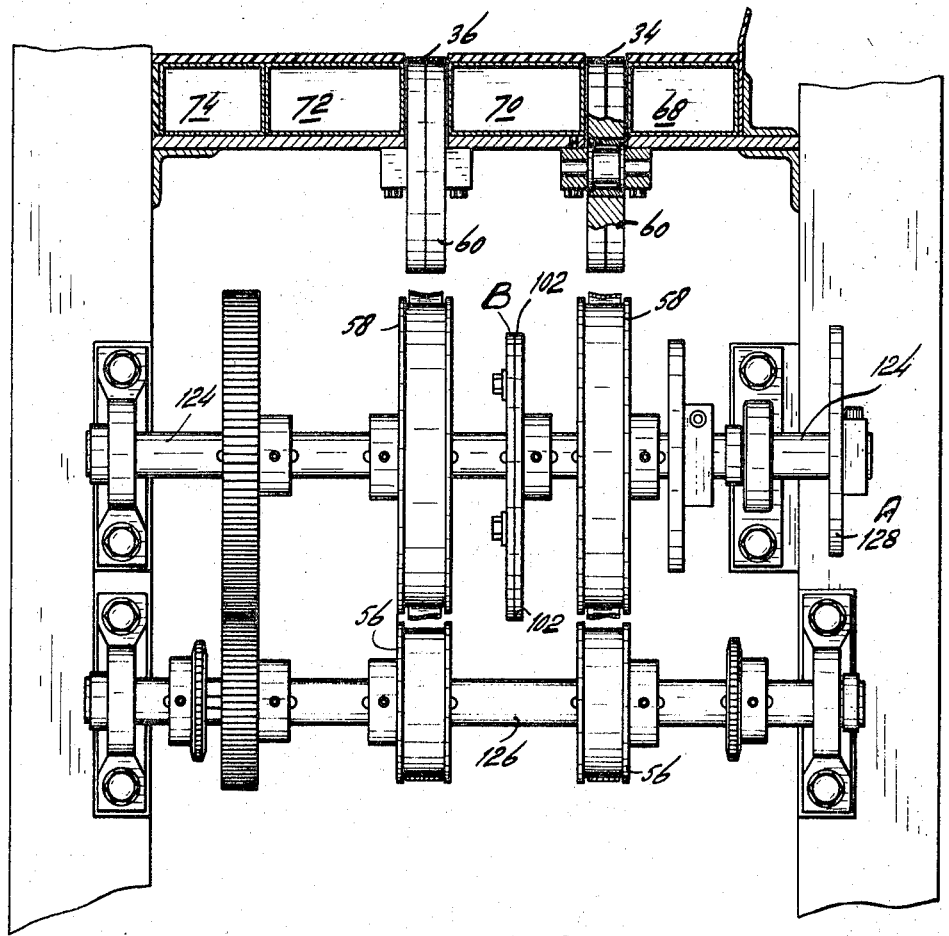
FIG. 9 is a transverse fragmentary, sectional view, taken along sectional line 9—9 of FIG. 5.
Figure 10:
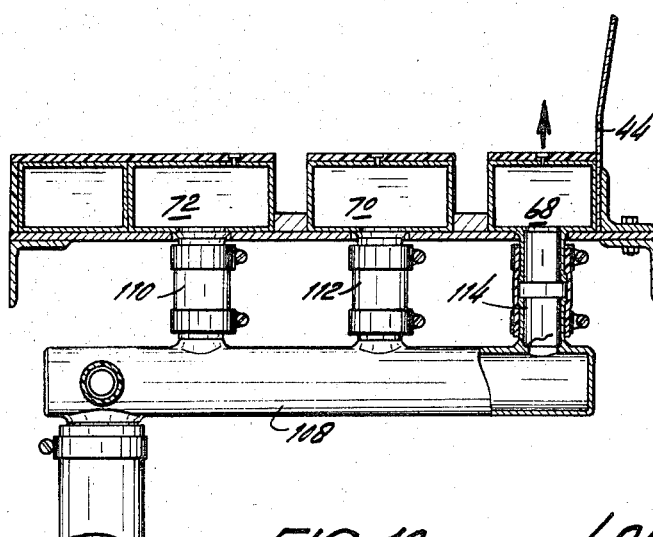
FIG. 10 is a fragmentary horizontal section, taken along section line 10—10 of FIG. 3, and showing the air chambers in the table top.
Figure 19:
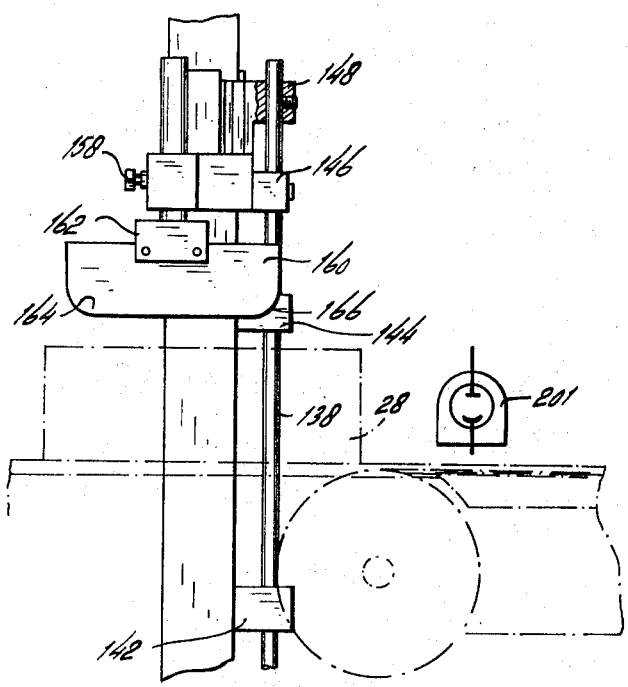
FIG. 19 is a fragmentary elevation, partially in section, taken along section line 11—11 of FIG. 2 and showing a modified form of invention wherein a photo cell is used to regulate the solenoid and a photo cell connected clamping mechanism.
Figure 18:
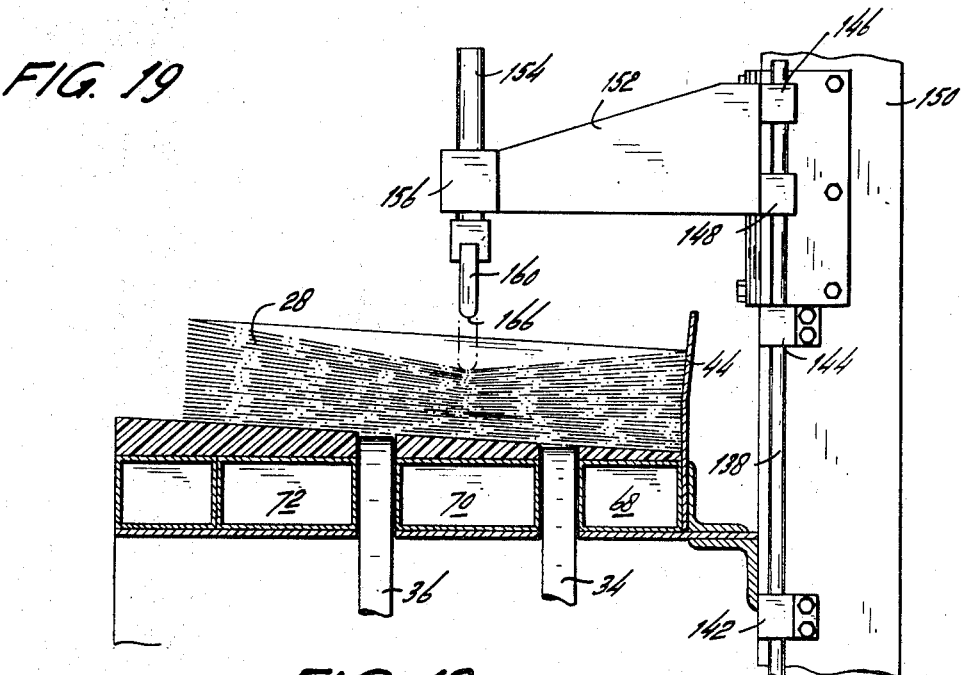
FIG. 18 is a fragmentary section, taken along section line 12—12 of FIG. 2 showing a modified form of invention, wherein the table is inclined towards the guard.

In FIG. 2, this proposed structure is further illustrated, the table top 42 having air holes 46, further illustrated in FIGS. 6, 9, and 10 as emanating from compressed air chambers 68, 70, and 72 beneath table top 42. As illustrated in FIGS. 3 and 10, manifold 108 may lead from turbine or like blower 110 and extend into the respective compartments 68, 70, and 72 by means of ducts 114, 112, and 110. The effect of forcing pressurized air through apertures 46 is to lift the ream above the surface of the table, thus enhancing surging by the frictional engagement of tapes 38 and 40 onto the underside of the ream.

Figure 7:
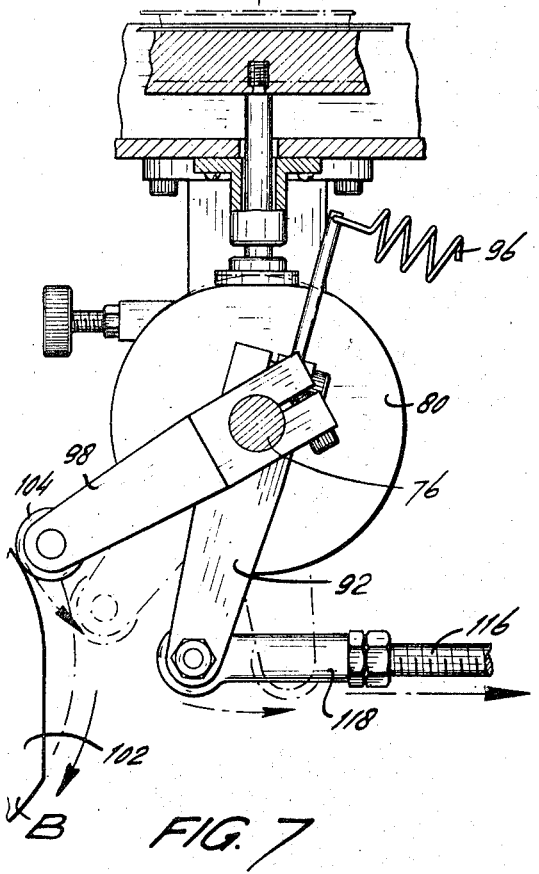
FIG. 7 is a fragmentary, enlarged sectional view, taken along section line 7—7 of FIG. 6.
Figure 8:
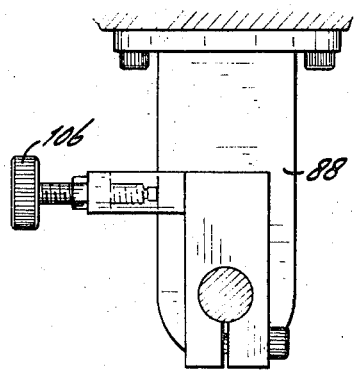
FIG. 8 is an enlarged fragmentary perspective, taken along section line 8—8 of FIG. 6.

In FIGS. 4 and 5, the endless belt tape surge mechanism is shown. Tapes 38 and 40 are mounted upon idler rollers 48; supported at the table end, rollers 50 and 52 supported upon adjustable bracket 122, idler roller 54 supported upon bracket 120, rollers 56, 58, and 60. Rollers 56 and 58 are the drive rollers, as illustrated in FIG. 9. Idler roller 60 extends above plate 170, which is actuated vertically, as illustrated in FIGS. 5, 6, and 7 by the action of cam B 102 mounted upon shaft 124. As the cam B 102 is rotated so that its distended or eccentric surface contacts roller 104 mounted on arm 98 attached to shaft 76, yoke 92 also secured to shaft 76 is pivoted vertically against the action of tension spring 96. Simultaneously yoke 92 longitudinally pushes rod 116, so as to vertically align the pusher elements, generally designated as 62, 64, and 66 in FIG. 5. The individual pusher elements are paired as illustrated in FIG. 6, so as to include cam members 80 and 78 secured to shaft 76 by an Allen head nut or the like, to engage piston 80, head 82. Piston 80 is reciprocably supported in annular bracket 84 and at its other end 86 is secured in Teflon or like friction resistant plate 170, abutting the inner surface of tapes 34 and 36. As the cam B 102 is rotated, the rods 116 are longitudinally moved to force the yoke members 92 into upright position, pushing the piston head 80 upwardly so that plates 170 engage the tape inner surfaces, as illustrated schematically in FIGS. 15 and 16. As this action, occurs, the reams 28 are surged longitudinally towards the ream stop assembly 24 mounted at the feeding end 25 of the table. As illustrated in FIGS. 6 and 8, shaft 76 may be supported in a pair of brackets 88 and 90, adjustably located radially by means of thumb screw 106 or the like.

The ream stopping assembly 24 is more particularly illustrated in FIGS. 11 and 12, as consisting of horizontal arm 152, having its hinge-like members 146 and 148 secured by set screws means to vertically reciprocating shaft 138. Shaft 138 has a bottom, flanged head 140 and is supported in brackets 142 and 144 secured to the upstanding post 150. At its outer end, arm 152 has a collar 156 and set screw assembly 158 for supporting stop shaft 154 in various attitudes of vertical adjustment. At the bottom of shaft 154, bracket 162 secures by set screws or the like, stopping plate 160 having rounded ends 164 and 166.

As cam 128 (A) is rotated about shaft 124, as illustrated in FIG. 11, cam follower 130 having roller end 131 is pivoted about pin 135 mounted in bracket 137. As a result, cam follower wheel 136 supported on arm 134 is depressed. As cam follower wheel 136 is depressed, shaft 138 drops causing the plate 160 to engage the lead ream, as illustrated in FIG. 12. In FIG. 11, the opposite effect is shown and corresponding to FIGS. 14 and 15 where the plate 160 is lifted above the lead ream, permitting surging of the ream outwardly through the register feeding end of the table.

A solenoid switching assembly 171 may be mounted in bracket 172 and have switching piston 173 with link 175 engaging arm 174, pivoted at 178, and having at its free end wheel 176 engaging the lateral arm 134. As the solenoid piston is retracted, the ream stop assembly is locked downwardly, so that plate 160 engages the lead ream. Thus, the plate 160 cannot be lifted to permit surging. As the solenoid piston 173 extends, play is given to permit lifting of the shaft 138, as illustrated in FIG. 11. As a result, surging of the lead ream through the feeding end is permitted. Manifestly, photocell 201 or microswitch means may be used to regulate the solenoid, for example, to prevent lifting of the assembly when there is not a sequential ream abutting the lead ream and, likewise, to permit lifting as such a ream falls into abutment with the lead ream.

In FIGS. 14–17, the sequence of operation of the cams (A) 128 and (B) 102 is illustated, Roman numerals I, II, III, and IV being placed respectively beneath FIGS. 14, 15, 16, and 17 to show the coordination of surging and stopping by the cams.

Manifestly, various types of surging structures and stopping assemblies may be employed without departing from the spirit of invention, as defined in the claims. Throughout the specification and claims, the terminology "ream" has been used to indicate a stack of any number of sheets of paper. However, the invention is not limited to register feeding of reams and may be applied to register feeding of various types of objects.

I claim:
1. Method of register feeding a plurality of longitudinally aligned reams of paper comprising:
   (A) advancing said reams into a collecting area having a receiving end and a feeding end;
   (B) surging said reams within said collecting area by frictionally engaging said reams from beneath, so as to advance said reams from said receiving end towards said feeding end; while
   (C) pushing downwardly onto a leading one of said reams within said feeding end, so as to stop advancing of said leading one and sequentially abutting ream; then
   (D) temporary releasing of said pushing downwardly, while surging so as to surge said leading ream through said feeding end;
   (E) reapplying said pushing as the next abutting ream enters said feeding area; and
   (F) forcing pressurized air upwardly into said collecting area, while frictionally engaging said reams from beneath.

2. Method of register feeding a plurality of reams of paper as in claim 1, including:
   (G) continuing surging by frictionally engaging said reams from beneath while pushing downwardly onto a leading one of said reams, so as to collect a plurality of reams in longitudinal abutment, and extending from said feeding end towards said receiving end.

3. Method of register feeding as in claim 2, including limiting releasing of pushing downwardly until a succeeding ream has been advanced to abutment with said leading ream.

4. Method of register feeding as in claim 2, wherein said surging is effected by lifting an endlessly rotating means into the horizontal plane of reams being collected.

5. Method of register feeding as in claim 4, including:
   (H) guiding said reams on one side of said collecting area, while surging and pushing downwardly.

6. Method of register feeding as in claim 5, including:
   (I) inclining said collecting area downwardly towards said guiding.

7. Method of register feeding as in claim 6, wherein said pushing downwardly and releasing of pushing is by vertical reciprocation into the axis of the advancing ream.

References Cited

UNITED STATES PATENTS

| | | | |
|---|---|---|---|
| 2,769,523 | 11/1956 | Ochwat | 198—34 |
| 2,850,144 | 9/1958 | Engleson | 198—26 X |
| 3,424,293 | 1/1969 | Deutschlander | 198—34 |

EDWARD A. SROKA, Primary Examiner